US012422821B2

United States Patent
Kajima

(10) Patent No.: US 12,422,821 B2
(45) Date of Patent: Sep. 23, 2025

(54) METHOD OF SETTING FACTOR VARIABLE AREA, AND SYSTEM

(71) Applicant: SEIKO EPSON CORPORATION, Tokyo (JP)

(72) Inventor: Mitsunori Kajima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 575 days.

(21) Appl. No.: 17/817,722

(22) Filed: Aug. 5, 2022

(65) Prior Publication Data

US 2023/0047908 A1  Feb. 16, 2023

(30) Foreign Application Priority Data

Aug. 10, 2021 (JP) .................... 2021-130455

(51) Int. Cl.
 *G05B 19/4155* (2006.01)
(52) U.S. Cl.
 CPC .......... *G05B 19/4155* (2013.01); *G05B 2219/31372* (2013.01)
(58) Field of Classification Search
 CPC ...... G05B 19/4155; G05B 2219/31372; G05B 2219/32177; G05B 2219/32222; G05B 19/41875; Y02P 90/02
 See application file for complete search history.

(56) References Cited

U.S. PATENT DOCUMENTS

| | | | |
|---|---|---|---|
| 11,170,332 B2 | 11/2021 | Koyama et al. | |
| 2003/0040954 A1* | 2/2003 | Zelek | G06Q 30/0201 705/7.29 |
| 2019/0164101 A1* | 5/2019 | Koyama | G06Q 10/06393 |

FOREIGN PATENT DOCUMENTS

| | | | |
|---|---|---|---|
| JP | 2010033536 A | | 2/2010 |
| JP | 2011150496 A | * | 8/2011 |
| JP | 2019101644 A | | 6/2019 |

OTHER PUBLICATIONS

Office Action for JP Patent Application No. 2021130455, issued on Apr. 15, 2025, 6 pages.

* cited by examiner

*Primary Examiner* — Yuhui R Pan
(74) *Attorney, Agent, or Firm* — CHIP LAW GROUP

(57) ABSTRACT

A method of the present disclosure includes (a) retrieving from a memory a plurality of measured values of the factor variable, and a label indicating good or bad of the quality corresponding to each of the plurality of measured values, (b) dividing a factor variable space defined by the factor variable into a plurality of grids by equally dividing a range determined by a maximum value and a minimum value of the plurality of measured values for each factor variable, (c) setting a plurality of candidate areas each of which includes one grid or a plurality of adjacent grids, and deriving, for each of the plurality of candidate areas, a good density based on the label associated with the measured value that is within the candidate area, and (d) selecting one of the plurality of candidate areas as the factor variable area, based on the good density.

4 Claims, 14 Drawing Sheets

METHOD OF SETTING FACTOR VARIABLE AREA, AND SYSTEM

The present application is based on, and claims priority from JP Application Serial Number 2021-130455, filed Aug. 10, 2021, the disclosure of which is hereby incorporated by reference herein in its entirety.

BACKGROUND

1. Technical Field

The present disclosure relates to a method of setting a factor variable area, and a system.

2. Related Art

JP-A-2011-150496 discloses a factor analysis apparatus that creates an analysis model from data such as manufacturing conditions and quality characteristics, and specifies an explanatory variable that results in a factor of a defect. By using a machine learning model as the analysis model, it is expected that the analysis can be performed with high accuracy.

However, if the machine learning model is used for the factor analysis, the analysis can be accurately performed, but it is difficult to interpret the model and know how to control the specified factor variable to reduce defects. Therefore, there has been a desire to successfully set the range of factor variables that can reduce defects regardless of whether a machine learning model is used or not.

SUMMARY

According to a first aspect of the present disclosure, a method of setting a factor variable area where quality related to a product or a manufacturing process of producing the product is good, the factor variable area being configured to define a range of a value of one or more factor variables when a condition of the manufacturing process is represented as the value of one or more factor variables is provided The method includes (a) retrieving from a memory a plurality of measured values of the factor variable, and a label indicating good or bad of the quality corresponding to each of the plurality of measured values, (b) dividing a factor variable space defined by the factor variable into a plurality of grids by equally dividing a range determined by a maximum value and a minimum value of the plurality of measured values for each factor variable, (c) setting a plurality of candidate areas each of which includes one grid or a plurality of adjacent grids, and deriving, for each of the plurality of candidate areas, a good density based on the label associated with the measured value that is within the candidate area, and (d) selecting one of the plurality of candidate areas as the factor variable area, based on the good density.

According to a second aspect of the present disclosure, a system configured to execute a process of setting a factor variable area where quality related to a product or a manufacturing process of producing the product is good, the factor variable area being configured to define a range of a value of one or more factor variables when a condition of the manufacturing process is represented as the value of one or more factor variables is provided. The system includes a memory configured to store a plurality of measured values of the factor variable, and a label indicating good or bad of the quality corresponding to each of the plurality of measured values, and one or a plurality of processors configured to execute a process of determining the factor variable area. The processor executes (a) a process of retrieving from the memory the plurality of measured values and the label corresponding to each of the plurality of measured values, (b) a process of dividing a factor variable space defined by the factor variable into a plurality of grids by equally dividing a range determined by a maximum value and a minimum value of the plurality of measured values for each factor variable, (c) a process of deriving a good density based on the label associated with the measured value that is within the grid for each of the plurality of grids, and (d) a process of setting one grid or a plurality of the grids adjacent to each other as the factor variable area, based on the good density.

DESCRIPTION OF EXEMPLARY EMBODIMENTS

A. First Embodiment

Figure 1:
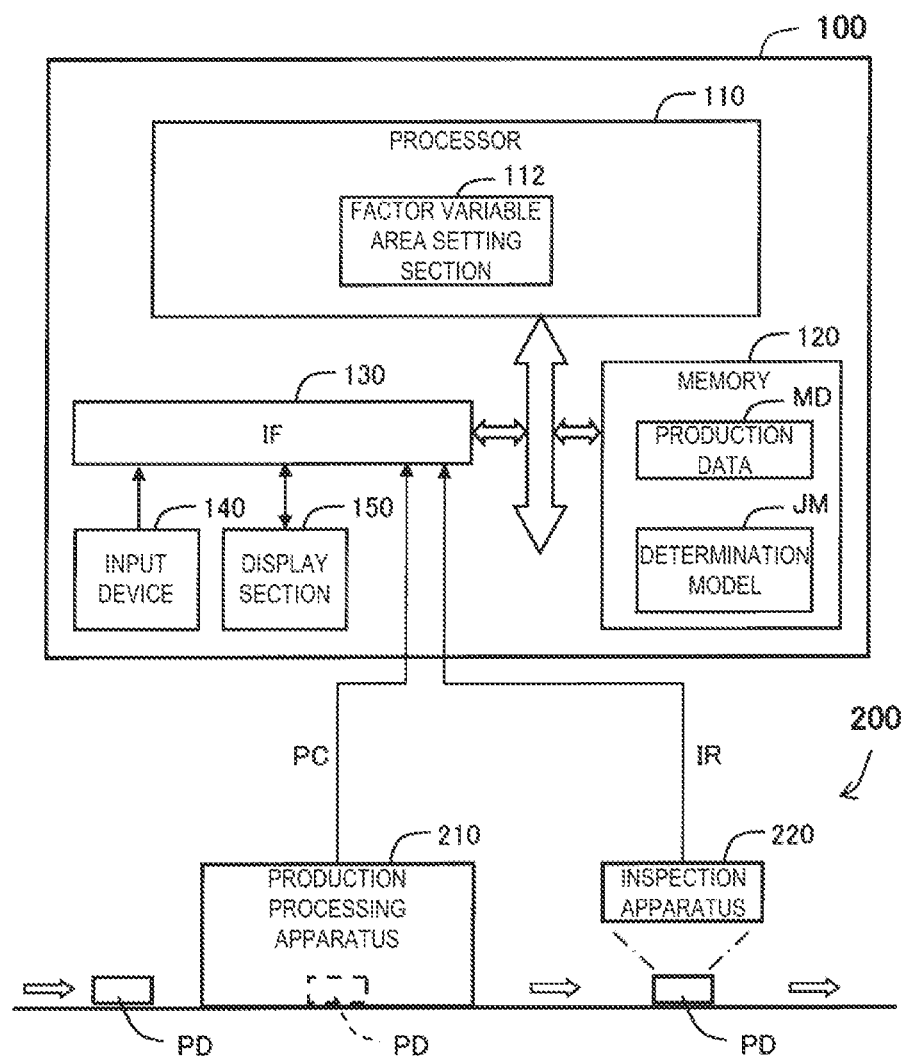
FIG. 1 is a conceptual view of a factor analysis system of an embodiment.

FIG. 1 is a block diagram illustrating a factor analysis system of the embodiment. This factor analysis system includes an information processing apparatus 100 and a production line 200.

The production line 200 includes a production processing apparatus 210 that processes a product PD, and an inspection apparatus 220 that performs quality inspection on the processed product PD. A processing condition PC of the production processing apparatus 210 and an inspection result IR of the inspection apparatus 220 are supplied to the information processing apparatus 100. The inspection result IR includes labels indicating good or bad. This label is a label that indicates whether the quality of the product PD or the manufacturing process of the product PD is good or bad. The processing condition PC is environment data such as the air pressure, preset values such as the processing voltage and pressure, measurement data during the manufacturing process, and the like, for example.

The information processing apparatus 100 includes a processor 110, a memory 120, and an interface circuit 130. An input device 140 and a display section 150 are also connected to the interface circuit 130, and further, the production processing apparatus 210 and the inspection apparatus 220 are also connected to the interface circuit 130. The processor 110 has not only a function of executing the process elaborated below, but also a function of displaying, on the display section 150, data obtained through the process and data generated in the course of the process.

The processor 110 functions as a factor variable area setting section 112 that executes the setting section of the factor variable area. The function of the factor variable area setting section 112 may be implemented by the processor 110 executing the computer program stored in the memory 120. Note that the function of the factor variable area setting section 112 may be implemented by a hardware circuit. The processor of this specification is a term that encompasses such a hardware circuit. In addition, the processor that executes the process of the factor variable area setting section 112 may be a processor included in a remote computer connected to the information processing apparatus 100 through a network. In addition, the process of the factor variable area setting section 112 may be executed with a plurality of processors.

The memory 120 stores production data MD and a determination model JM. The production data MD is a set of the processing condition PC and the inspection result IR. The determination model JM is a machine learning model that determines the estimated label from the factor variable. The factor variable is a variable of a part of the processing condition PC, and the estimated label is an estimation value of a label indicating the quality of the inspection result IR. Various neural networks, support vector machines, and random forests and the like may be used as the machine learning model. In the present embodiment, it is assumed that the determination model JM has been learned. Note that the determination model JM may be omitted.

Note that the terms "explanatory variable" and "response variable" are used as general terms of factor analysis. The explanatory variable is a variable that is the cause, and the response variable is a variable that indicates the result that occurred in response to that cause. In the present disclosure, the factor variable that is a part of the processing condition PC corresponds to "explanatory variable", and the label of the inspection result IR corresponds to "response variable".

Figure 2:
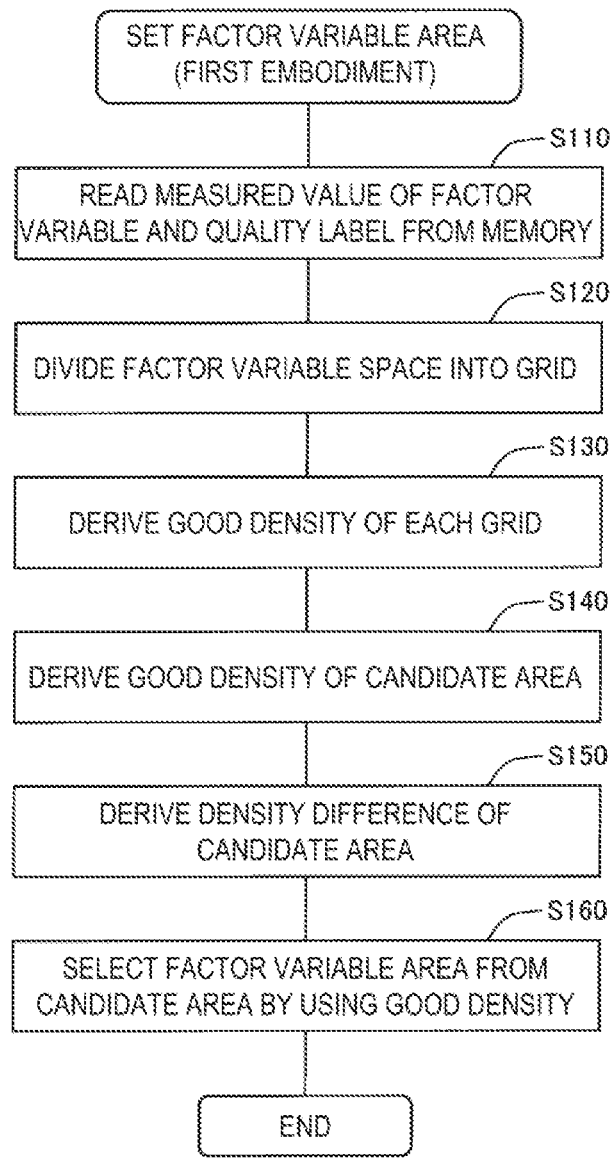
FIG. 2 is a flowchart illustrating a procedure of setting a factor variable area of the first embodiment.

FIG. 2 is a flowchart illustrating a procedure of setting a factor variable area of the first embodiment. At step S110, the factor variable area setting section 112 reads the measured value of the factor variable and the quality label from the memory 120. The measured value of the factor variable is live data of a part of the processing condition PC. The quality label is associated with the measured value of the factor variable. At step S120, the factor variable area setting section 112 divides the factor variable space into a grid.

Figure 3:
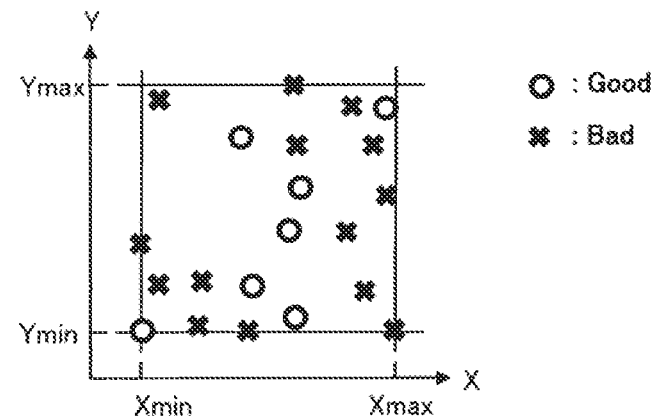
FIG. 3 is an explanatory diagram illustrating an example in which a factor variable space is divided into a grid.
Figure 3:
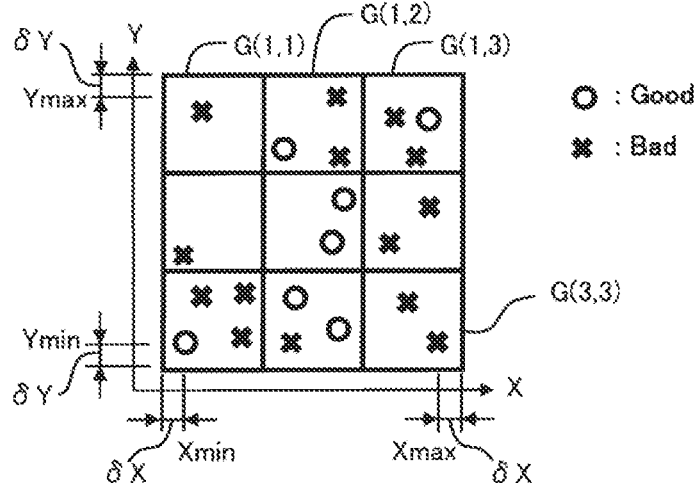

FIG. 3 is an explanatory diagram illustrating an example in which a factor variable space is divided into a grid. The abscissa X and the ordinate Y in FIG. 3 are factor variables. Note that the number of factor variables may be set to any numbers greater than one. In the present disclosure, the space represented by the factor variable is referred to as "factor variable space". The upper diagram in FIG. 3 illustrates a distribution of quality labels. The white circles are good labels, and the crosses are bad labels.

The dots indicating a plurality of quality labels are located between a maximum value Xmax and a minimum value Xmin of the measured value of a factor variable X, and between a maximum value Ymax and a minimum value Ymin of the measured value of a factor variable Y. The lower diagram in FIG. 3 illustrates an example in which the factor variable space including all quality labels is divided into nine grids G (i, j). Here, i, j indicates the row position and the column position of the grid, and is i=1 to 3 and j=1 to 3. The grids G (i, j) are set by equally dividing the range set from the maximum value Xmax to the minimum value Xmin of the measured value for the factor variable X, and equally dividing the range set from the maximum value Ymax to the minimum value Ymin of the measured value also for the factor variable Y. Note that the X position of the outermost periphery of the grid G (i, j) is set to the position obtained by adding a margin 5X to the maximum value Xmax and the minimum value Xmin of the factor variable X. This margin 5X may be zero, or small values other than zero. The same applies to a margin 5Y of the factor variable Y. Note that in general, when the number m of the factor variable is set to an integer of 1 or greater, it is an m-dimensional solid. As in the example of FIG. 3, in the case of m=2, the grid shape is a rectangular shape, and the rectangular is also a kind of the m-dimensional solid. The range of the factor variables X and Y are equally divided, and therefore the grids G (i, j) have the same size.

Note that while each of the factor variables X and Y is divided into three parts in FIG. 3, the number of divisions may be set to any value greater than two. In addition, while the number of divisions of the grid in the two factor variables X and Y are the same number in FIG. 3, the number of divisions of the grid may be changed for each factor variable by using the contribution or the importance of each of the factor variables X and Y calculated by using the determination model JM.

Figure 4:
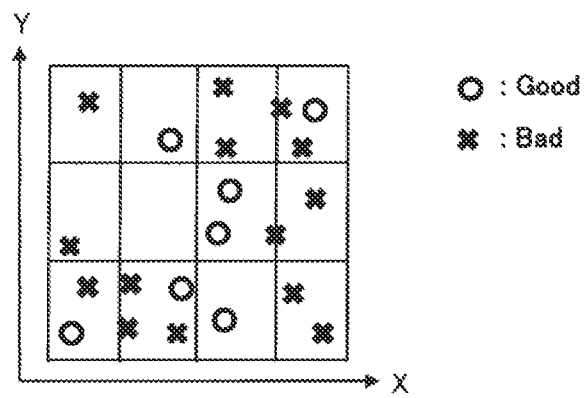
FIG. 4 is an explanatory diagram illustrating another example of grid division.
Figure 4:
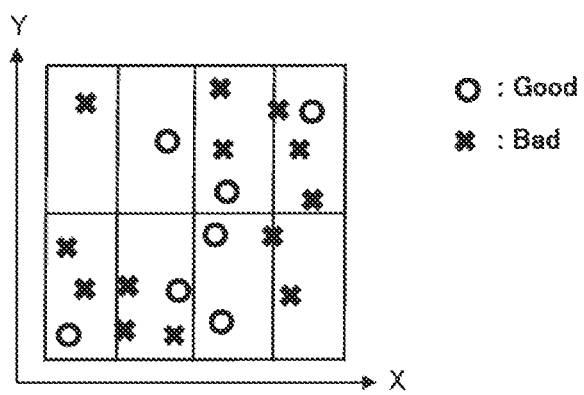

FIG. 4 is an explanatory diagram illustrating an example of grid division in accordance with importance I(X) and importance I(Y) of the factor variables X and Y. In the upper diagram in FIG. 4, the importance I(X) of the factor variable X is higher than the importance I(Y) of the factor variable Y, and therefore the number of divisions of the grid of the factor variable X is set to a value greater than the number of divisions of the grid of the factor variable Y. In the upper diagram in FIG. 4, the difference between the importance I(X) of the factor variable X and the importance I(Y) of the factor variable Y is further larger, and therefore the difference between the number of divisions of the grid of the factor variable X and the number of divisions of the grid of the factor variable Y is set to a further larger value. In this manner, it is possible to emphasize the boundary of more meaningful factor variable and deemphasize the boundary of less meaningful factor variable by increasing the number of divisions for the axis of the factor variable with high importance and reducing the number of divisions for the axis of the factor variable with low importance. In this manner, the factor variable area can be efficiently set while reducing the computational quantity. Note that Permutation importance, which is an index value indicating the usefulness of a feature of a machine learning model, may be used as the contribution and the importance of the factor variable, for example. In addition, in the case where the determination model JM is configured as a random forest, the Gini coefficient may be used as the contribution and the importance of the factor variable. Note that the example of the grid division illustrated in FIG. 3 is used in the following description.

At step S130 in FIG. 2, the factor variable area setting section 112 derives the good density of each grid. A good density Dg is calculated by the following expression.

$$Dg=Ng(k)/\Sigma Ng \tag{E1}$$

Here, k is the ordinal number of the grid, Ng(k) is the number of good labels included in the kth grid, and ΣNg is the sum of the number of good labels in all grids.

Note that in the above-described Expression (E1), ΣNg is a constant value, and the number Ng(k) of good labels included in the grid may be used as it is as the good density. In general, the "good density" of the grid can be defined as a variable indicating the value proportional to the number Ng(k) of good labels included in the grid.

Figure 5:
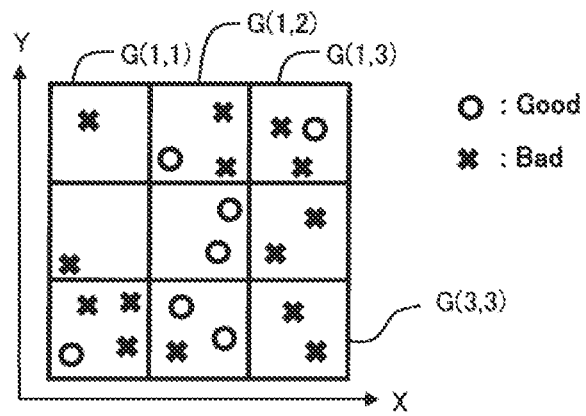
FIG. 5 is an explanatory diagram illustrating a good density of each grid.
Figure 5:
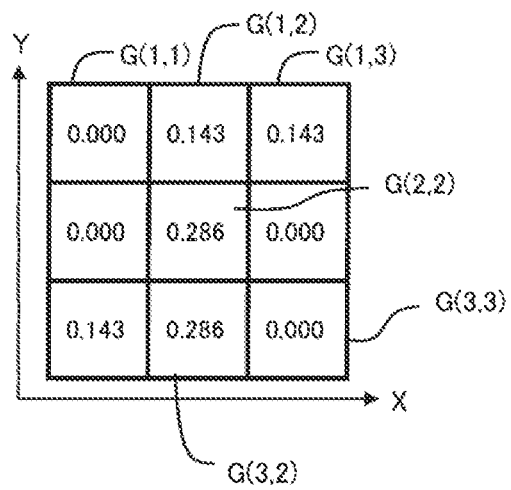

FIG. 5 is an explanatory diagram illustrating the good density of each grid. In this example, the good density Dg of two grids G (2, 2) and G (3, 2) is the largest at 0.286.

At step S140 in FIG. 2, the factor variable area setting section 112 sets a plurality of candidate areas, and derives the good density of each candidate area. The candidate area is set as one grid area, or an area including a plurality of adjacent grids. While each grid G (i, j) illustrated in FIG. 5 is also one candidate area, the good density of each grid G (i, j) has been calculated at step S130, and therefore, at step S140, the good density is calculated for a candidate area including a plurality of adjacent grids.

Figure 6:
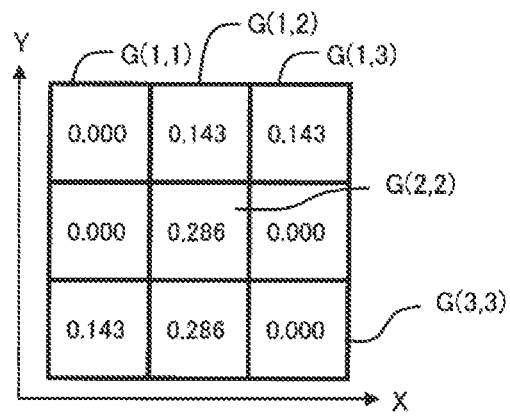
FIG. 6 is an explanatory diagram illustrating a good density of each candidate area.
Figure 6:
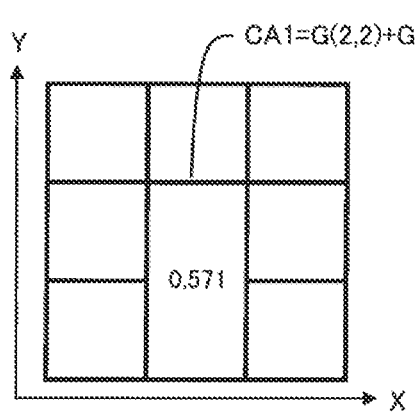
Figure 6:
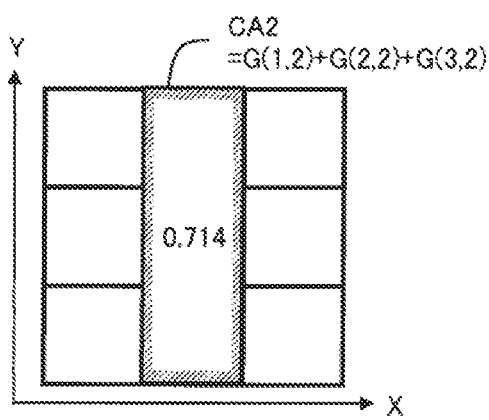
Figure 6:
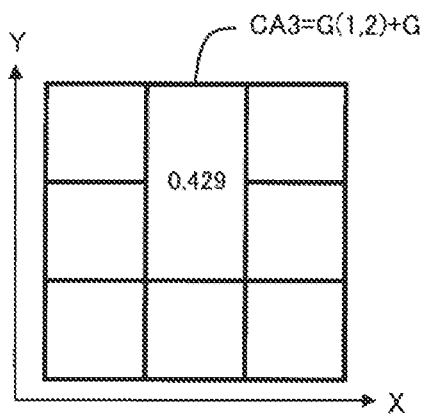
Figure 6:
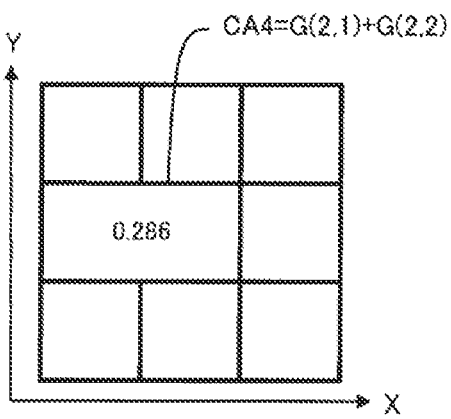

FIG. 6 is an explanatory diagram illustrating a setting example of a candidate area and the good density of each candidate area. Here, examples of good densities of nine grids G (i, j) illustrated in FIG. 5 and other four candidate areas CA1 to CA4 are illustrated. The first candidate area CA1 is composed of two grids G (2, 2) and G (3, 2) adjacent to each other in the vatical direction. The second candidate area CA2 is composed of three grids G (1, 2), G (2, 2) and G (3, 2) adjacent to each other in the vatical direction. The third candidate area CA3 is composed of two grids G (1, 2) and G (2, 2) adjacent to each other in the vatical direction. The fourth candidate area CA4 is composed of two grids G (2, 1) and G (2, 2) adjacent to each other in the horizontal direction. Note that each of these four candidate areas CA1 to CA4 is set to include the center grid G (2, 2) with the highest good density Dg of each grid G (i, j). The reason for this is that the candidate area including the center grid G (2, 2) with the highest good density Dg is likely to be selected as the final factor variable space. Note that other candidate areas may also be set.

The good density Dg of each candidate area is expressed by the following expression similar to the above-described Expression (E1).

$$Dg=Ng(n)/\Sigma Ng \tag{E2}$$

Here, n is the ordinal number of the candidate area, Ng(n) is the number of good labels included in the nth candidate area, and ΣNg is the sum of the number of good labels in all grids. Note that each grid is also one candidate area, and therefore Expression (E2) can be regarded as a generalization of the above-described Expression (E1). In the example illustrated in FIG. 6, the good density of the second candidate area CA2 is the largest at 0.714.

Note that in the above-described Expression (E2), ΣNg is a constant value, and therefore the number Ng(n) of good labels included in the candidate area may be used as it is as the good density. In general, the "good density" of the candidate area can be defined as a variable indicating a value proportional to the number Ng(n) of good labels included in the candidate area.

At step S150 in FIG. 2, the factor variable area setting section 112 derives the density difference of each candidate area. A density difference ΔD is expressed by the following expression.

$$\Delta D=Dg-Db \tag{E3a}$$

$$Dg=Ng(n)/\Sigma Ng \tag{E3b}$$

$$Db=Nb(n)/\Sigma Nb \tag{E3c}$$

Here, Dg is the good density, Db is the bad density, n is the ordinal number of the candidate area, Ng(n) is the number of good labels included in the nth candidate area, ΣNg is the sum of the number of good labels in all grids, Nb (n) is the number of bad labels included in the nth candidate area, and ΣNb is the sum of the number of bad labels in all grids. The above-described Expression (E3b) is the same as the above-described Expression (E2).

Figure 7:
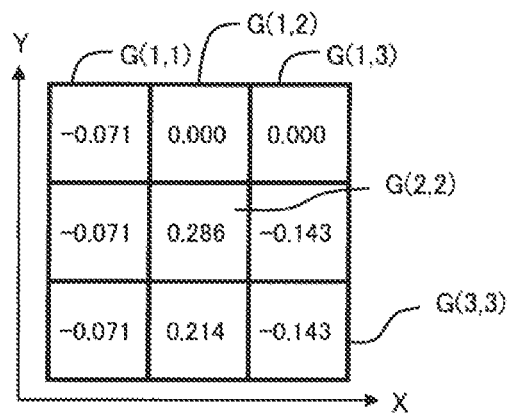
FIG. 7 is an explanatory diagram illustrating a density difference of each candidate area.
Figure 7:
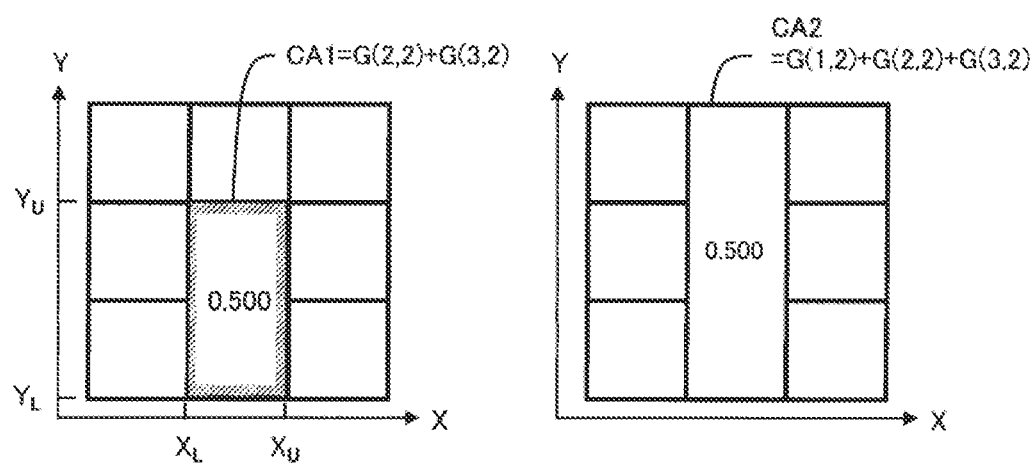
Figure 7:
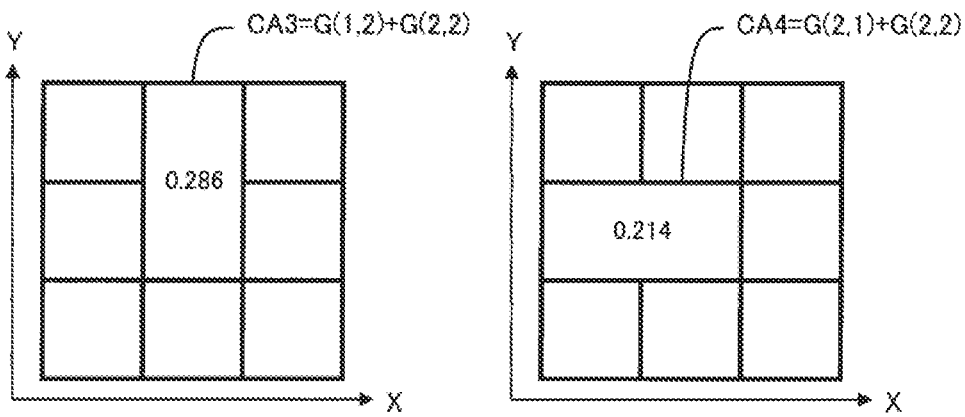

FIG. 7 is an explanatory diagram illustrating the density difference of each candidate area. In this example, the density difference ΔD in the first candidate area CA1 and the second candidate area CA2 is the largest at 0.500.

At step S160 in FIG. 2, the factor variable area setting section 112 selects the factor variable area from the candidate area by using the good density. This selection can be made by using the good density of each candidate area illustrated in FIG. 6 or the density difference of each candidate area illustrated in FIG. 7.

In the case where the good density illustrated in FIG. 6 is used, the good density of the second candidate area CA2 is the largest among all candidate areas, and the second candidate area CA2 is selected as the factor variable area. This factor variable area is used as the range of the processing condition in the production processing apparatus 210 when the process of the product PD is executed in the production line 200 illustrated in FIG. 1. As a result, the possibility that the processed product PD is determined to be good by the inspection apparatus 220 can be increased.

In the case where the density difference illustrated in FIG. 7 is used, the density difference in the first candidate area CA1 and the second candidate area CA2 is the largest among all candidate areas. Note that since the second candidate area CA2 includes the grid G (1, 2) where the density difference is zero, it is preferable to select the first candidate area CA1 that does not include the grid G (1, 2) as the factor variable area. Note that the method of determining the factor variable area in accordance with the density difference ΔD can be regarded as a kind of the method of determining the factor variable area based on the good density.

As the method of selecting the factor variable area, it is preferable to use the method of using the density difference illustrated in FIG. 7 rather than the method of using the good density illustrated in FIG. 6. The reason for this is that with the method of using the density difference illustrated in FIG. 7, the first candidate area CA1 selected as the factor variable area is an area that does not include the grid G (1, 2) with a large number of bad labels illustrated in FIG. 3. Thus, with the method of using the density difference illustrated in FIG. 7, the factor variable area with a lower bad rate can be selected.

Note that the candidate area CA1 serving as the factor variable area has a shape defined by the range of an upper limit Xu and a lower limit value $X_L$ of the factor variable X and the range of an upper limit $Y_U$ and a lower limit value YL of the factor variable Y as illustrated in FIG. 7. Thus, since it suffices to control each of the range of the factor variables X and Y as the range of the processing condition in the production processing apparatus 210, the processing condition can be advantageously easily controlled. Thus, since it suffices to control each of the range of the factor variables X and Y as the range of the processing condition in the production processing apparatus 210, the processing condition can be advantageously easily controlled.

As described above, in the first embodiment, the factor variable area is determined based on the good density in the candidate area including one grid or a plurality of adjacent grids, and thus the factor variable area whose quality is good can be easily determined.

B. Second Embodiment

Figure 8:
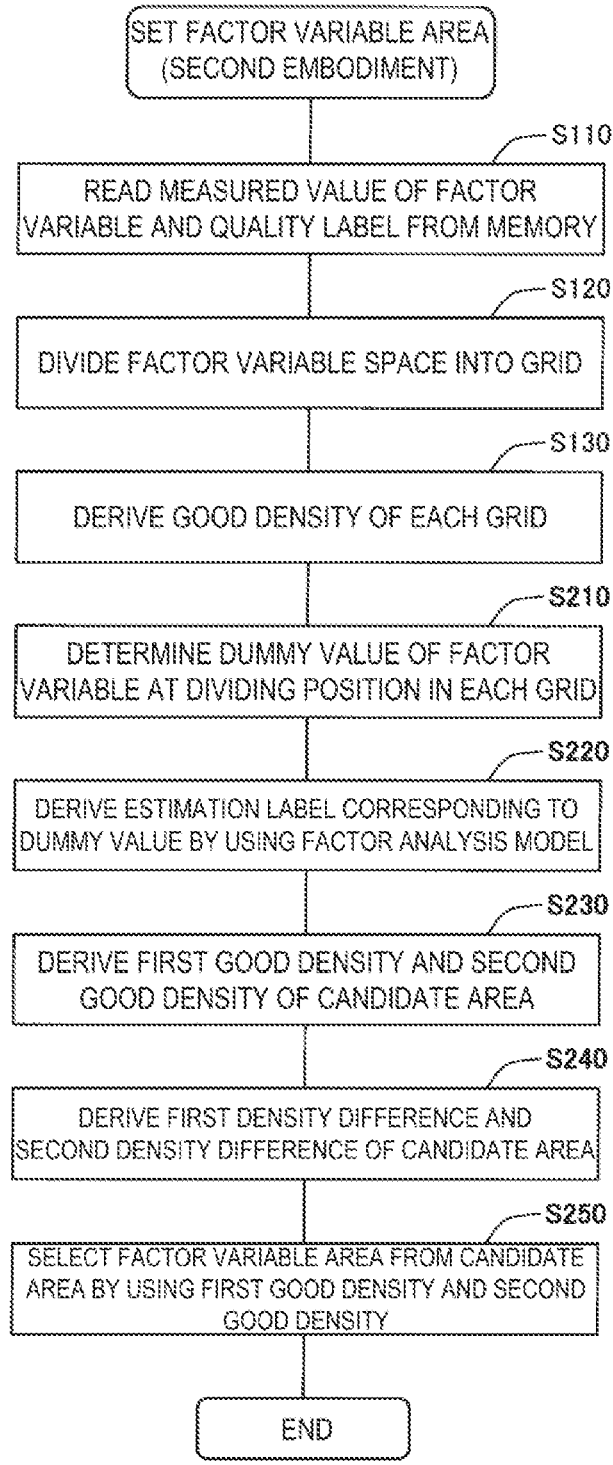
FIG. 8 is a flowchart illustrating a procedure of setting a factor variable area in a second embodiment.

FIG. 8 is a flowchart illustrating a procedure of setting a factor variable area in a second embodiment. Note that the apparatus configuration is the same as that illustrated in FIG. 1, and therefore the description thereof is omitted. Steps S110 to S130 in FIG. 8 are the same as steps S110 to S130 in FIG. 2 in the first embodiment, while the processes after step S140 in FIG. 2 are replaced by steps S210 to S250 in the second embodiment. When the processes up to step S130 have been performed, the state where the good density of each grid has been calculated is set as illustrated in FIG. 5.

At step S210, the factor variable area setting section 112 sets the dividing position in each grid, and determines the dummy value of the factor variable at the dividing position. At step S220, the factor variable area setting section 112 derives the estimated label corresponding to the dummy value by using the determination model JM.

Figure 9:
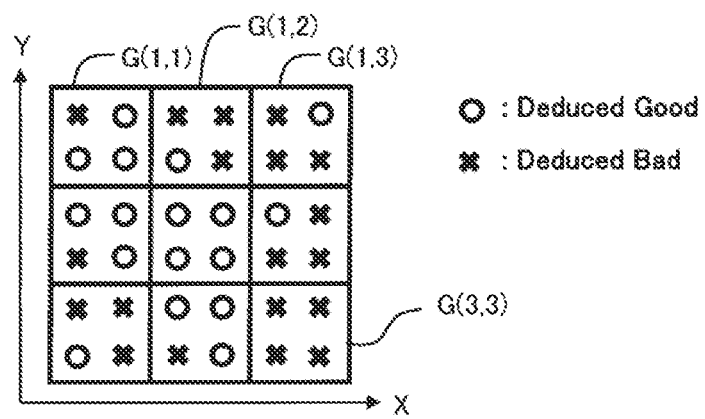
FIG. 9 is an explanatory diagram illustrating an estimated label and its second good density in a dummy value of a factor variable.
Figure 9:
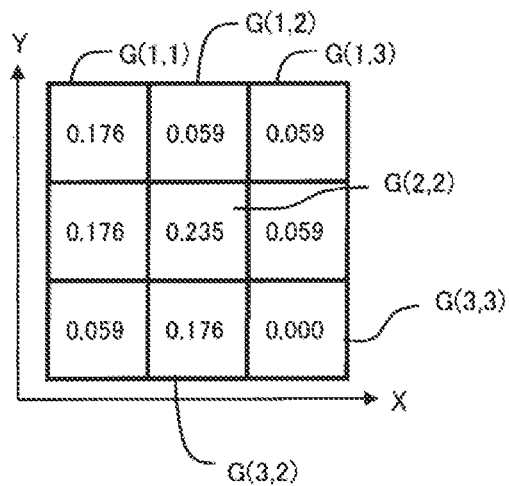

On the upper side in FIG. 9, an example of a setting of the dividing position in each grid, and an example of the estimated label corresponding to the dummy value of the factor variables X and Y at each dividing position are illustrated. In this example, in each grid G (i, j), 2×2 dividing positions are set in a uniform distribution. The dummy value of the factor variables X and Y at each dividing position is automatically determined based on the dividing positions. The estimated label corresponding to the dummy value of the factor variables X and Y at each dividing position can be determined by inputting the dummy value to the determination model JM.

At step S230 in FIG. 8, the factor variable area setting section 112 sets the candidate area, and derives a first good density and a second good density for each candidate area. As in the first embodiment, the candidate area is set as an area including one grid area or a plurality of adjacent grids. The "first good density" is a good density based on a label associated with the measured value of the factor variables X and Y, and is calculated by using Expression (E2) described in the first embodiment. That is, the first good density is the same as the good density illustrated in FIG. 6 described in the first embodiment. The "second good density" is a good density based on the estimated label associated with the dummy value. On the lower side in FIG. 9, the value of the second good density of each grid G (i, j) is illustrated.

Figure 10:
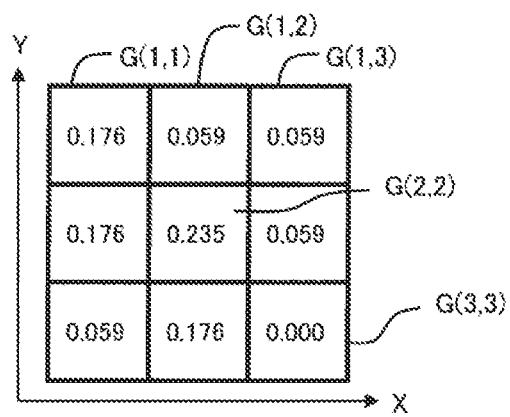
FIG. 10 is an explanatory diagram illustrating a second good density of each candidate area.
Figure 10:
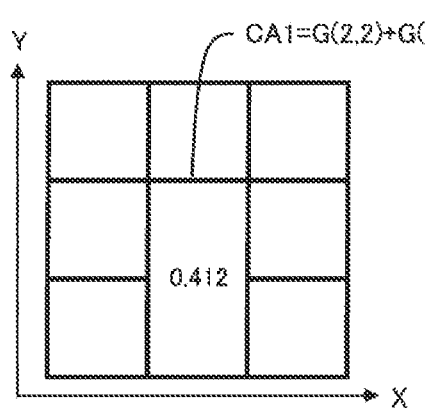
Figure 10:
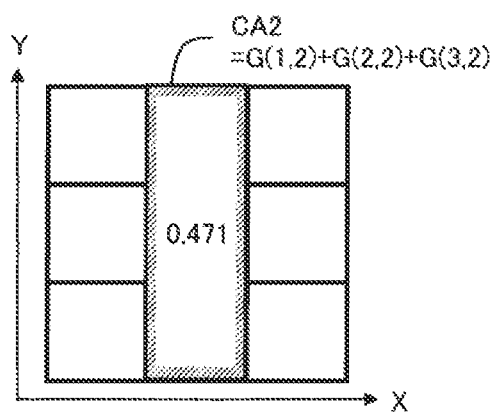
Figure 10:
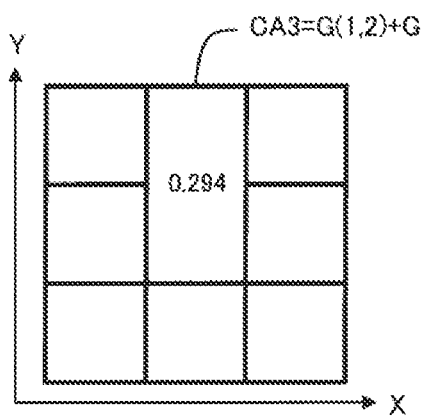
Figure 10:
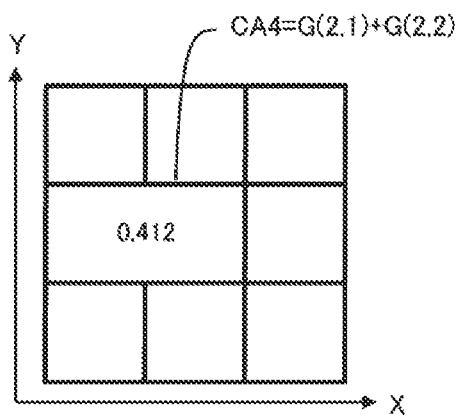

FIG. 10 is an explanatory diagram illustrating a second good density of each candidate area. In the example illustrated in FIG. 10, the second good density of the second candidate area CA2 is the largest at 0.471 among all candidate areas.

At step S240 in FIG. 8, the factor variable area setting section 112 derives a first density difference and a second density difference for each candidate area. The "first density difference" and "second density difference" are the density difference ΔD expressed by Expression (E3a) described in the first embodiment. In the second embodiment, the density difference ΔD calculated by using the measured value of the factor variables X and Y and the quality label is referred to as the "first density difference", and the density difference ΔD calculated by using the dummy value of the factor variables X and Y and the estimated label is referred to as "the second density difference". The first density difference is the density difference illustrated in FIG. 7 described in the first embodiment.

Figure 11:
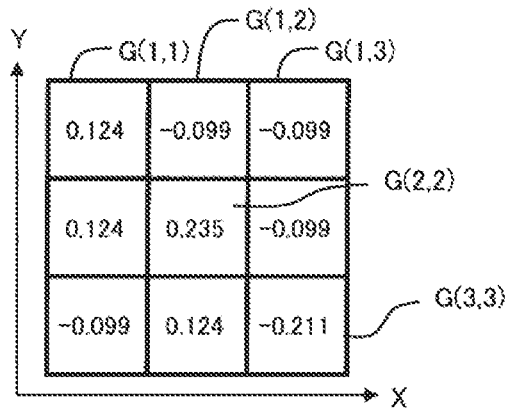
FIG. 11 is an explanatory diagram illustrating a second density difference of each candidate area.
Figure 11:
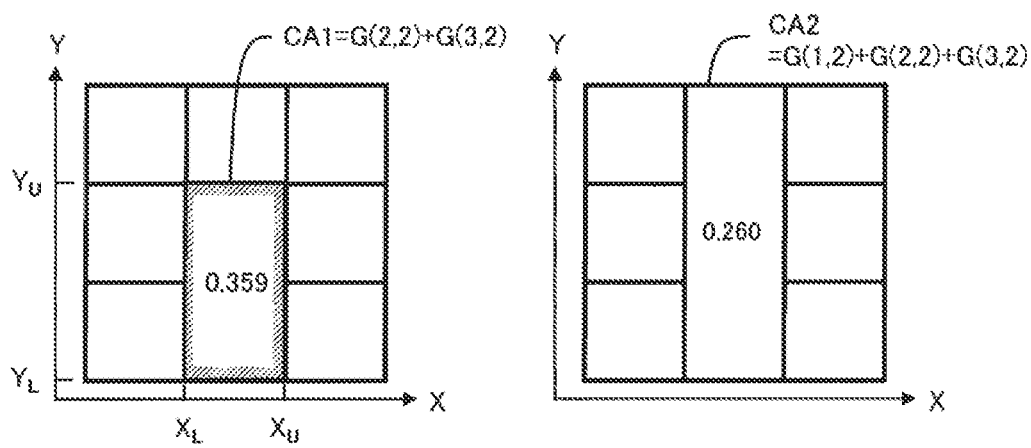
Figure 11:
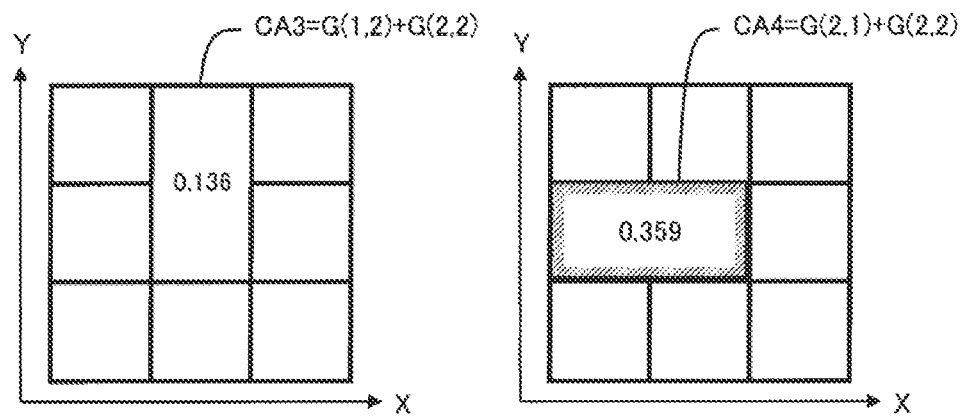

FIG. 11 is an explanatory diagram illustrating a second density difference of each candidate area. In this example, a second density difference ΔD in the first the candidate area CA1 and a fourth candidate area CA4 is the largest at 0.359.

At step S250 in FIG. 8, the factor variable area setting section 112 selects the factor variable area from the candidate area by using the first good density and the second good density. This selection can be made by using the first good density and the second good density of each candidate area illustrated in FIG. 6 and FIG. 10, or the first density difference and the second density difference of each candidate area illustrated in FIG. 7 and FIG. 11.

As the method of selecting one candidate area as the factor variable area by using the first good density illustrated in FIG. 6 and the second good density illustrated in FIG. 10, any of the following methods may be used.

Method M11

By using only one of the first good density and the second good density, the candidate area with the largest value thereof is selected as the factor variable area.

For example, in the case where only the first good density is used, the method M11 is the same as the method used at step S150 in the above-described first embodiment. Alternatively, the factor variable area may be selected by using only the second good density. In this case, in the example illustrated in FIG. 10, the second candidate area CA2 is selected as the factor variable area.

Method M12

The candidate area is selected as the factor variable area by using both the first good density and the second good density.

For example, the candidate area with the largest integrated good density may be selected as the factor variable area by calculating the integrated good density by adding the first good density and the second good density. This addition may be made through simple addition or weighted addition. Alternatively, the candidate area with the largest integrated good density may be selected as the factor variable area by calculating the integrated good density by multiplying the first good density and the second good density.

Also in the method of selecting one candidate area as the factor variable area by using the first density difference illustrated in FIG. 7 and the second density difference illustrated in FIG. 11, the candidate area with the largest value thereof may be selected as the factor variable area by using only one of the first density difference and the second density difference as in the above-described method M11. Alternatively, as in the above-described method M12, the candidate area may be selected as the factor variable area by using both the first density difference and the second density difference. For example, in the case where the factor variable area is determined by using only the second density difference ΔD, either the first the candidate area CA1 or the fourth candidate area CA4 is selected as the factor variable area. With reference to the lower diagram in FIG. 3, these candidate areas CA1 and CA4 can be seen as areas with a large number of good labels corresponding to the measured value of the factor variables X and Y, and with almost no bad label. Accordingly, these candidate areas CA1 and CA4 are areas especially preferable as the control range of the factor variable whose inspection result is good. The method of determining the factor variable area in accordance with the second density difference ΔD may be regarded as a kind of the method of determining the factor variable area based on the second good density.

As described above, in the second embodiment, the factor variable area is selected by using the first good density corresponding to the measured value of the factor variable and/or the second good density corresponding to the dummy value of the factor variable, and thus the factor variable area can be more correctly set.

C. Third Embodiment

Figure 12:
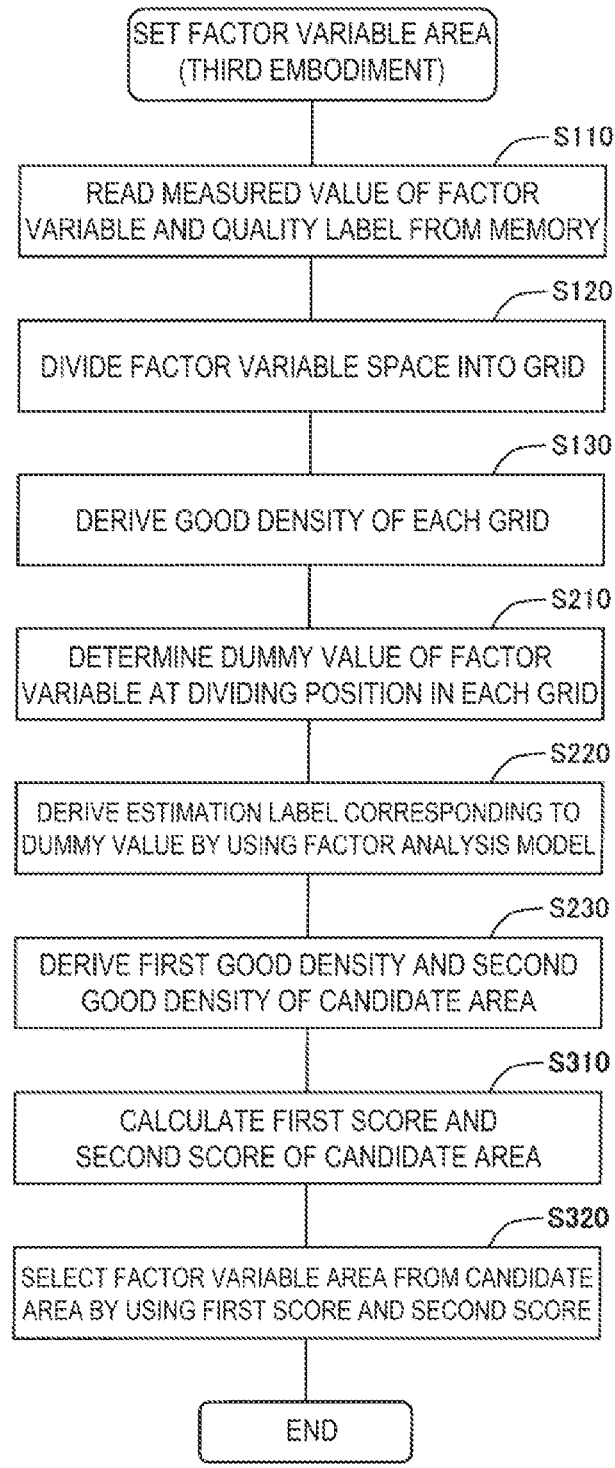
FIG. 12 is a flowchart illustrating a procedure of setting a factor variable area in a third embodiment.

FIG. 12 is a flowchart illustrating a procedure of setting a factor variable area in a third embodiment. Note that the apparatus configuration is the same as that illustrated in FIG. 1, and therefore the description thereof is omitted. Steps S110 to S130 in FIG. 12 are the same as steps S110 to S130 in FIG. 2 in the first embodiment, and steps S210 to S230 in FIG. 12 are the same as steps S210 to S230 in FIG. 8 in the second embodiment. In the third embodiment, the processes after step S240 in FIG. 8 are replaced by steps S310 to S320. When the processes up to step S230 have been performed, the state where the first good density illustrated in FIG. 6 and the second good density illustrated in FIG. 10 have been obtained for each candidate area is set.

At step S310, the factor variable area setting section 112 calculates a first score and a second score of the candidate area. The first score is a score calculated by using the first good density, and the second score is a score calculated by using the second good density. These scores Sc are calculated by the following expression, for example.

$$Sc=\{(Dg-Db)/(Dg+Db)\} \times Dg \quad (E4)$$

Here, Dg is the good density given by the above-described Expression (E3b), and Db is the bad density given by the above-described Expression (E3c). Both the first score and the second score are calculated by the above-described Expression (E4), but when they are discriminated from each other, they are referred to as the first score Sc_1 and the second score Sc_2 with "_1" or "_2" attached at the end.

The values in the inner parentheses on the right side in the above-described (E4) may be regarded as indexes indicating the ratio of the numbers of the good label and the bad label in the candidate area. In addition, Dg, which is the last element on the right side in the above-described (E4), may be regarded as an index indicating the size of the candidate area. As described above, the score Sc is a value positively correlated with the ratio of the numbers of the good label and the bad label in the candidate area, and the size of the candidate area. Alternatively, the score Sc may be regarded as a value positively correlated with the good density for the candidate area and the size of the candidate area.

The first the score Sc_1 is a score obtained by calculating the good density Dg and a bad density Db in the above-described Expression (E4) based on the quality label associated with the measured value of the factor variables X and Y. The second the score Sc_2 is a score obtained by calculating the good density Dg and the bad density Db in the above-described Expression (E4) based on the estimated label associated with the dummy value of the factor variables X and Y.

Figure 13:
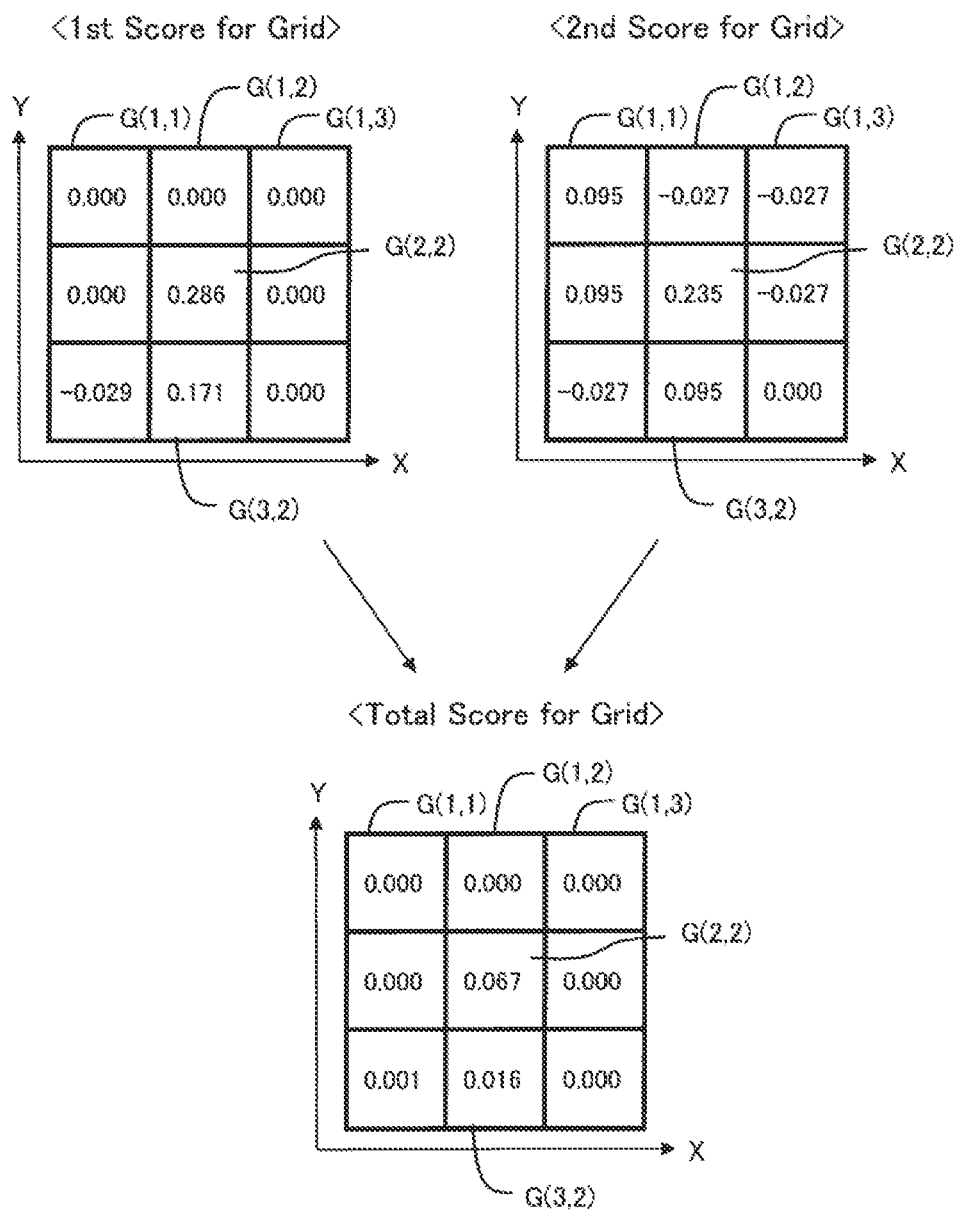
FIG. 13 is an explanatory diagram illustrating a first score, a second score and an integration score of each grid.

FIG. 13 illustrates a first score and a second score calculated for each grid. In the first score, the score value in the center grid G (2, 2) is the largest at 0.286. Also in the second score, the score value in the center grid G (2, 2) is largest at 0.235. The first score and the second score are calculated also for the candidate area including a plurality of grids, but the illustration thereof is omitted.

At step S320 in FIG. 12, the factor variable area setting section 112 selects the factor variable area from the candidate area by using the first score and the second score. As the method of selecting one candidate area as the factor variable area by using the first score and the second score, any of the following methods may be used.

Method M21

By using only one of the first score and the second score, the candidate area with the largest value thereof is selected as the factor variable area.

Method M22

The candidate area is selected as the factor variable area by using both the first score and the second score.

For example, the candidate area with the largest integration score may be selected as the factor variable area by calculating the integration score by adding the first score and the second score. This addition may be made through simple addition or weighted addition. Alternatively, the candidate area with the largest integration score may be selected as the factor variable area by calculating the integration score by multiplying the first score and the second score.

In the third embodiment, the method of calculating the integration score by multiplying the first score and the second score in the above-described method M22 is employed. An integration score St is expressed by the following expression.

$$St=Sc\_1 \times Sc\_2 \quad (E5)$$

Here, Sc_1 is the first score, and Sc_2 is the second score.

On the lower side in FIG. 13, the integration score St of each grid is illustrated. Also in the integration score St, the value at the center grid G (2, 2) is the largest at 0.067.

Figure 14:
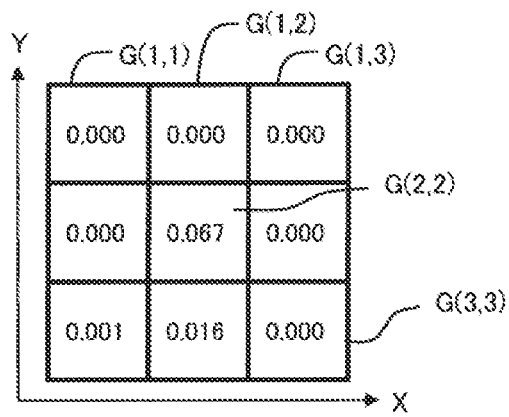
FIG. 14 is an explanatory diagram illustrating an integration score of each candidate area.
Figure 14:
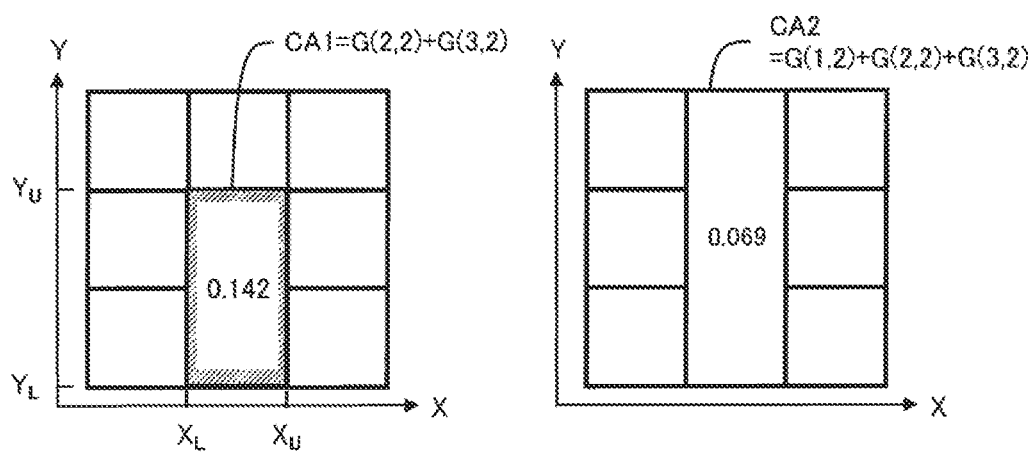
Figure 14:
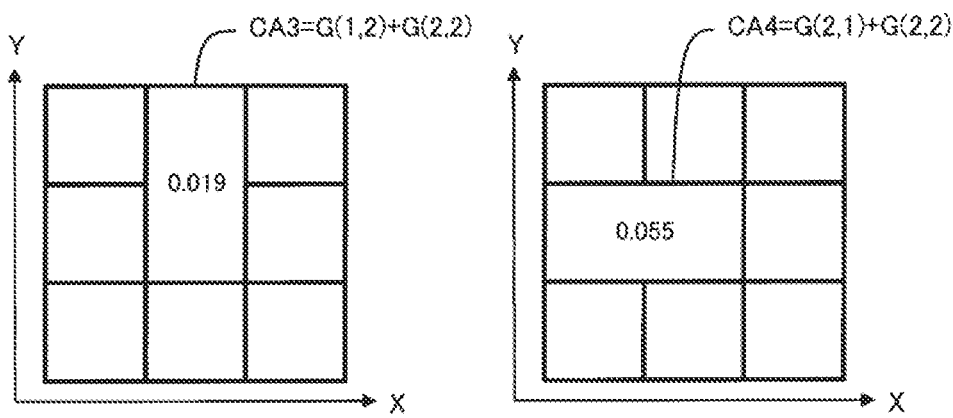

FIG. 14 is an explanatory diagram illustrating the integration score St of each candidate area. Here, in the nine grids G (i, j) and other four candidate areas CA1 to CA4, the value of the integration score St in the first the candidate area CA1 is the largest at 0.142. Therefore, at step S320, this candidate area CA1 is selected as the factor variable area. With reference to the lower diagram in FIG. 3, this candidate area CA1 can be seen as an area with a large number of good labels corresponding to the measured value of the factor variables X and Y, and with almost no bad label. Accordingly, this candidate area CA1 is an area especially preferable as the control range of the factor variable whose inspection result is good.

Note that the score Sc may be calculated by using functions and/or expressions other than the above-described Expression (E4). Note that in any case, it is preferable that the score Sc be positively correlated with the good density for the candidate area and the size of the candidate area. In this manner, an area with larger size and higher good density can be set as the factor variable area.

As described above, in the third embodiment, the appropriate factor variable area can be easily set by using the score.

In each of the above-described embodiments, the factor variables X and Y are assumed to be quantitative variables, but the present disclosure can also be applied when some of the factor variables are qualitative variables. When qualitative factor variables are included, grid division is not performed for qualitative factor variables because there is no concept of minimum and maximum values as there is for quantitative factor variables. In addition, when determining candidate areas, a different search method may be required for qualitative factor variables than for quantitative factor variables. For example, for qualitative factor variables, the qualitative factor variables may be classified into multiple categories, and when setting candidate areas, some of the categories may be combined by logical OR. Specifically, the candidate areas may be set by combining multiple categories in order of increasing number of good labels by logical OR. In this manner, it is possible to perform the process of setting factor variable regions in a factor variable space that has both qualitative and quantitative factor variables.

OTHER EMBODIMENTS

The present disclosure is not limited to the embodiments described above, and may be implemented in various aspects without departing from the spirits of the disclosure. For example, the disclosure may be achieved in embodiments (aspects) described below. Appropriate replacements or combinations may be made to the technical features in the above-described embodiments which correspond to the technical features in the aspects described below to solve some or all of the problems of the disclosure or to achieve some or all of the advantageous effects of the disclosure. Additionally, when the technical features are not described herein as essential technical features, such technical features may be appropriately deleted.

(1) According to a first aspect of the present disclosure, a method of setting a factor variable area where quality related to a product or a manufacturing process of producing the product is good, the factor variable area being configured to define a range of a value of one or more factor variables when a condition of the manufacturing process is represented as the value of one or more factor variables is provided The method includes (a) retrieving from a memory a plurality of measured values of the factor variable, and a label indicating good or bad of the quality corresponding to each of the plurality of measured values, (b) dividing a factor variable space defined by the factor variable into a plurality of grids by equally dividing a range determined by a maximum value and a minimum value of the plurality of measured values for each factor variable, (c) setting a plurality of candidate areas each of which includes one grid or a plurality of adjacent grids, and deriving, for each of the plurality of candidate areas, a good density based on the label associated with the measured value that is within the candidate area, and (d) selecting one of the plurality of candidate areas as the factor variable area, based on the good density.

With this method, the factor variable area is determined based on the good density in the candidate area including one grid or the plurality of adjacent grids, and thus the factor variable area whose quality is good can be easily determined.

(2) The above-described method may further include, before (d), acquiring, as a dummy value of the factor variable, a value of a position where each of the plurality of grids is equally divided for each factor variable, and deriving an estimated label indicating estimated good or bad of the quality by inputting the dummy value to a determination model that learned a correspondence relationship between the measured value and the label. Further, (c) may include deriving, for each of the plurality of candidate areas, as the good density, (i) a first good density based on the label associated with the measured value and (ii) a second good density based on the estimated label associated with the dummy value that are within the candidate area, and in (d), one of the plurality of candidate areas may be selected as the factor variable area by using the first good density and the second good density.

With this method, the factor variable area is selected by using the first good density corresponding to the measured value of the factor variable and the second good density corresponding to the dummy value of the factor variable, and thus the factor variable area can be more correctly set.

(3) In the above-described method, (d) may include calculating, for each of the plurality of candidate areas, a score positively correlated with the good density for the candidate area and a size of the candidate area, and selecting one of the plurality of candidate areas as the factor variable area in accordance with the score.

With this method, the factor variable area can be easily set by using the score.

(4) In the above-described method, (d) may include calculating, for each of the plurality of candidate areas, a first score positively correlated with the first good density for the candidate area and a size of the candidate area, calculating, for each of the plurality of candidate areas, a second score positively correlated with the second good density for the candidate area and the size of the candidate area, and selecting one of the plurality of candidate areas as the factor variable area in accordance with the first score and the second score.

With this method, the factor variable area can be easily set by using the score.

(5) According to a second aspect of the present disclosure, a system configured to execute a process of setting a factor variable area where quality related to a product or a manufacturing process of producing the product is good, the factor variable area being configured to define a range of a value of one or more factor variables when a condition of the manufacturing process is represented as the value of one or more factor variables is provided. The system includes a memory configured to store a plurality of measured values of the factor variable, and a label indicating good or bad of the quality corresponding to each of the plurality of measured values, and one or a plurality of processors configured to execute a process of determining the factor variable area. The processor executes (a) a process of retrieving from the memory the plurality of measured values and the label corresponding to each of the plurality of measured values, (b) a process of dividing a factor variable space defined by the factor variable into a plurality of grids by equally dividing a range determined by a maximum value and a minimum value of the plurality of measured values for each factor variable, (c) a process of deriving a good density based on the label associated with the measured value that is within the grid for each of the plurality of grids, and (d) a process of setting one grid or a plurality of the grids adjacent to each other as the factor variable area, based on the good density.

The present disclosure may be implemented in various forms other than those described above. For example, it may be implemented with a factor analysis apparatus, a computer program for implementing a function of a factor analysis apparatus, a non-transitory storage medium recording the computer program, and the like.

What is claimed is:

1. A method of setting a factor variable area, the method comprising:
retrieving from a memory a plurality of measured values of at least one factor variable, and a label indicating good quality or bad quality of a product or a manufacturing process of producing the product corresponding to each of the plurality of measured values;

dividing a factor variable space, defined by the at least one factor variable, into a plurality of grids by equally dividing a range determined by a maximum value and a minimum value of the plurality of measured values for each factor variable of the at least one factor variable;

setting a plurality of candidate areas based on the division, wherein each of the plurality of candidate areas includes one grid of the plurality of grids or a plurality of adjacent grids of the plurality of grids;

deriving, for the each of the plurality of candidate areas, a density of each grid of the plurality of grids based on the label associated with a measured value of the plurality of measured values that is within the each of the plurality of candidate areas;

acquiring, as a dummy value of the at least one factor variable, a value of a position where each grid of the plurality of grids is equally divided for the each factor variable of the at least one factor variable;

deriving an estimated label indicating estimated good quality or estimated bad quality of the product or the manufacturing process of producing the product by inputting the dummy value to a determination model that learned a correspondence relationship between the measured value and the label;

deriving, for the each of the plurality of candidate areas, a first density and a second density of the each grid of the plurality of grids, wherein the first density is based on the label associated with the measured value, and the second density is based on the estimated label associated with the dummy value that are within a candidate area of the plurality of candidate areas; and selecting one of the plurality of candidate areas as the factor variable area, based on the first density and the second density, wherein the factor variable area defines a range of a value of the at least one factor variable based on representation of a condition of the manufacturing process as the value of the at least one factor variable.

2. The method according to claim 1, wherein the selection of the one of the plurality of candidate areas as the factor variable area includes:

calculating, for the each of the plurality of candidate areas, a score positively correlated with the first density for the candidate area and a size of the candidate area; and selecting the one of the plurality of candidate areas as the factor variable area in accordance with the score.

3. The method according to claim 1, wherein the selection of the one of the plurality of candidate areas as the factor variable area includes:

calculating, for the each of the plurality of candidate areas, a first score positively correlated with the first density for the candidate area and a size of the candidate area;

calculating, for the each of the plurality of candidate areas, a second score positively correlated with the second density for the candidate area and the size of the candidate area; and selecting the one of the plurality of candidate areas as the factor variable area in accordance with the first score and the second score.

4. A system configured to execute a process of setting a factor variable area, the system comprising:

a memory configured to store a plurality of measured values of at least one factor variable, and a label indicating good quality or bad quality of a product or a manufacturing process of producing the product corresponding to each of the plurality of measured values; and one or a plurality of processors configured to execute a process of determining the factor variable area, wherein the one or the plurality of processors executes;

process of retrieving from the memory the plurality of measured values and the label corresponding to the each of the plurality of measured values;

a process of dividing a factor variable space, defined by the at least one factor variable, into a plurality of grids by equally dividing a range determined by a maximum value and a minimum value of the plurality of measured values for each factor variable of the at least one factor variable;

a process of setting a plurality of candidate areas based on a division, wherein each of the plurality of candidate areas includes one grid of the plurality of grids or a plurality of adjacent grids of the plurality of grids;

a process of deriving, for the each of the plurality of candidate areas, a density of each grid of the plurality of grids based on the label associated with a measured value of the plurality of measured values that is within the each of the plurality of candidate areas:

a process of acquiring, as a dummy value of the at least one factor variable, a value of a position where each of the plurality of grids is equally divided for each factor variable of the at least one factor variable;

a process of deriving an estimated label indicating estimated good quality or estimated bad quality of the product or the manufacturing process of producing the product by inputting the dummy value to a determination model that learned a correspondence relationship between the measured value and the label;

a process of deriving, for the each of the plurality of candidate areas, a first density and a second density of the each grid of the plurality of grids, wherein the first density is based on the label associated with the measured value, and the second density is based on the estimated label associated with the dummy value that are within a candidate area of the plurality of candidate areas; and a process of selecting one of the plurality of candidate areas as the factor variable area, based on the first density and the second density, wherein the factor variable area defines a range of a value of the at least one factor variable based on representation of a condition of the manufacturing process as the value of the at least one factor variable.

* * * * *